April 19, 1966    R. C. WEBSTER ETAL    3,246,993
PREPARATION OF FROZEN DISCRETE CITRUS FRUIT CELLS
Filed Dec. 4, 1961
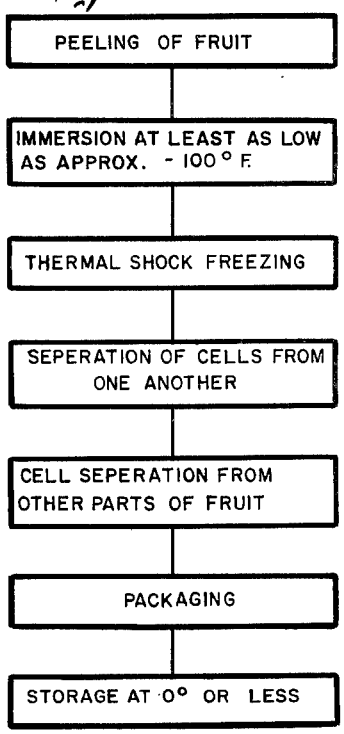
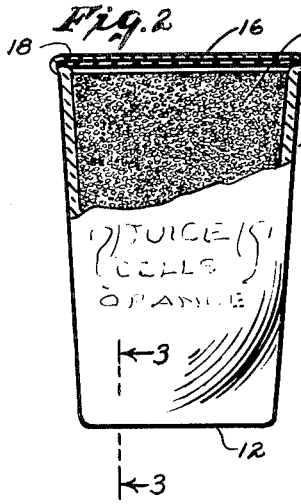
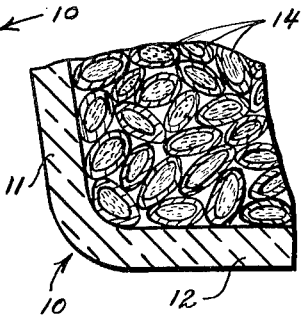
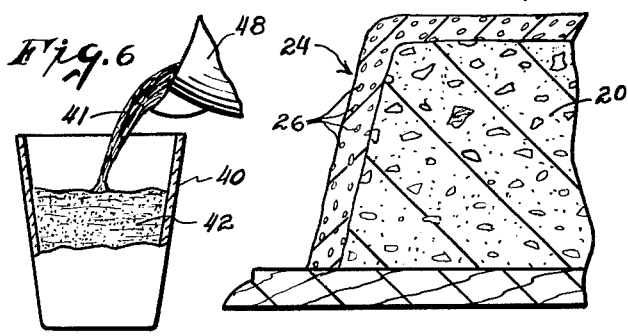
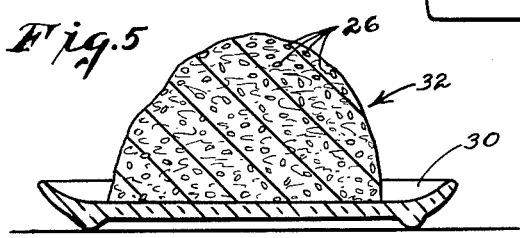
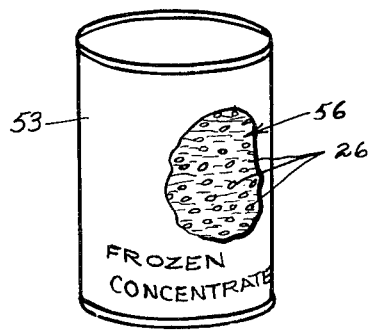
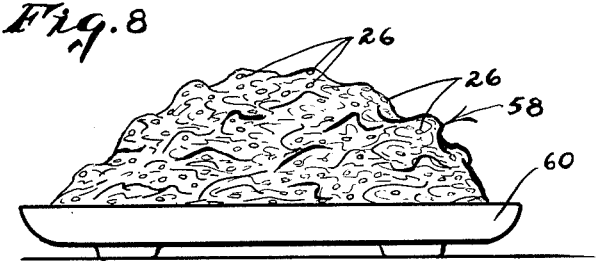
INVENTORS
ROBERT C. WEBSTER
ELMER C. PARISH
BY
AGENT

3,246,993
PREPARATION OF FROZEN DISCRETE CITRUS FRUIT CELLS

Robert C. Webster, Madison, Wis., and Elmer C. Parish, Clearwater, Fla.; said Webster assignor to Air Reduction Company, Incorporated, New York, N.Y., a corporation of New York, and said Parish assignor to H. P. Hood & Sons Incorporated, Boston, Mass., a corporation of Massachusetts
Filed Dec. 4, 1961, Ser. No. 156,696
11 Claims. (Cl. 99—193)

This application is a continuation-in-part of application, S.N. 37,847, filed June 22, 1960, which is now abandoned.

This invention relates to citrus fruit products and methods of making and packaging them. More particularly, the invention relates to citrus fruit juice sacs or cells, to methods of separating them intact from other parts of the fruit, and to products obtained.

One object of the invention is to obtain a citrus fruit product which contains and preserves the juice of the fruit more effectively than those prepared by previously known methods. The invention is particularly applicable to the preserving of orange juice because that juice presents unusual difficulties in preserving fresh fruit flavor.

The problem is related to the anatomy of the fruit. An orange consists of a soft, pithy core, forming a central axis of the fruit, and segments (carpels, locules) distributed around the soft core and covered with an outer peel. Each of the segments is surrounded by a thin wall (carpellary membrane, locular wall) consisting of a tissue of epidermal origin. In the mature fruit there are juice-containing cells or bodies closely compacted in the segments and consisting of club-shaped vesicles.

These vesicles are multi-cellular in structure and have extremely thin walls of the cells. In addition to containing the juice, the vesicles contain the color-bearing yellow chromatophores. There are oil droplets embedded in the cellular tissue, and these oil droplets have an important bearing on the taste of the orange.

The term "cell" is used herein to designate these juice-containing sacs, and the expression "discrete juice cells" is used to designate cells that have been detached from other cells and from the other parts of the fruit without breaking the walls of the cells.

Generally, it is not feasible to separate individually the cells of citrus fruit in any known manner except in accordance with the present invention. Even attempts to manually pick apart the individual cells is not normally possible, aside from the obvious impracticability of such a mode of operation. This is apparently due to the inherenet mechanical characteristics of the cells and of their cohesive structure with one another. Thus, it appears that under normal circumstances the cohesive forces between the adjacent cells are sufficiently great that the strength of the cell walls or membranes defining the cells is not sufficiently great to withstand the forces that would normally have to be applied thereto in order to overcome the cohesion between the cells.

In premature fruit and late-bloom fruit, the cohesive structure of the cells differs somewhat from that of normally ripe fruit with which the present invention is primarily concerned. For example, in late-bloom fruit, the structure gives a "ricey" appearance in which it is conceivable that the cells might be more ameanable to being individually picked apart manually, due to the change of the cohesive structure of the cells. Its juice content is not only very low but is in itself not considered satisfactory for processing as a source of citrus fruit juice.

Persons skilled in this art are readily cognizant of normal fruit to which the present invention may advantageously be applied. However, the ripeness of the citrus fruits is commonly classified in terms of the ratio of its soluble solids to its acid content. The ratio of the soluble solids to the acid increases as the fruit ripens. The soluble solids is measured in degrees Brix and this measure is the ratio of the percent by weight of soluble solids in the juice to that of acid (anhydrous). Orange juice may be considered commercially ripe when it contains soluble solids between 8° and 25° Brix, and preferably between 9° and 20° Brix.

With other citrus fruits there is some difference in the soluble solids content of the ripe fruit. The other fruits may be considered commercially ripe with the following soluble solids contents:

Grapefruit between 5° and 14° Brix and preferably 7° and 12° Brix;
Limes between 6° and 14° Brix, and preferably between 8° and 12° Brix;
Lemons between 6° and 14° Brix, and preferably 7° and 12° Brix; and
Tangerines between 6° and 16° Brix, and preferably 8° and 14° Brix.

The peel has an inner, white spongy layer of pithy material and including parenchymatous cells which are closely adherent to the parts of the segment walls which confront the peel. There is an extensive system of radially-branching vascular bundles extending throughout the whole tissue between segnment of the fruit and over the outsides of the segments.

When oranges are squeezed for juice, there are a number of features which impair the keeping qualities of the juice. Changes in taste, sometimes amounting to the development of bitterness, are caused by substances located chiefly in the carpellary membranes and vascular bundles, the pithy core and the spongy tissue on the inside of the peel. In ordinary juice-extracting processes, these substances which may be referred to as the "solid materials" in the peeled fruit, are mixed into the juice.

The extracted juices contain appreciable oxygen, nitrogen and carbon dioxide. The oxygen and nitrogen enter the juice because of aeration which occurs during the extracting proces, and carbon dioxide comes from the intercellular spaces of the fruit.

The presence of oxygen is objectionable because it reacts with various constituents of the juice, and especially with the ascorbic acid. These reactions not only cause loss of Vitamin C but also produce undesirable changes in flavor and color.

It has been necessary, therefore, to deaerate the juice and this has been a step adding to the cost and complication of producing a preserved orange juice.

The preserving of orange juice by freezing has come into wide use in recent years and has become the most popular method of preserving the juice. Because of the amount of colloidal matter in orange juice, however, it has been necessary to freeze the juice quickly in order to prevent the colloidal matter from coagulating so that it settles out quickly when the juice thaws.

Other citrus fruits have an anatomy similar to that of an orange, though there are some differences in the chemistry.

It is another object of this invention to treat oranges and other citrus fruit so that the juice cells may be extracted without breaking them; and so that the juice cells and/or the juice may be extracted without mixture with the other substances contained in the pithy material or the carpellary membranes and the vascular bundles.

Another object is to extract the juice from the fruit without aeration of the juice, and in such a way that the subsequent deaeration step is unnecessary.

It is a further object of the invention to provide an improved method of treating oranges, and other citrus fruit which may afford better preservation of the juice.

This invention relates not only to the discrete juice cells and the methods by which they are made, but to the packaging of the juice cells and to some combinations of the juice cells with other food products for various end uses.

Other objects, features and advantages of the invention will appear or be pointed out as the description proceeds.

In the drawing, forming a part hereof, in which like reference characters indicate corresponding parts in all the views:

FIG. 1 is a flow diagram illustrating the different steps in the method of this invention;

FIG. 2 is an elevation, partly in section, showing a package of juice cells embodying this invention;

FIG. 3 is a greatly enlarged sectional view taken on the line 3—3 of FIG. 2;

FIG. 4 is a fragmentary sectional view through icing on a cake made in accordance with this invention;

FIG. 5 is a sectional view through a serving of ice cream made in accordance with this invention;

FIG. 6 is a sectional view illustrating the making of a beverage flavored with citrus juice in accordance with this invention;

FIG. 7 is a front elevation, partly broken away, showing a container with juice cells distributed through a frozen concentrate; and FIG. 8 is an elevation showing the juice cells distributed through cottage cheese.

FIG. 1 is a "flow diagram" showing the preferred procedure of this invention. In this procedure, the fruit is first peeled by any of the conventional peeling methods. This leaves some of the pithy lining of the peel on the outside surfaces of the section membranes (carpellary membranes).

The peeled fruit is then immersed in an extremely cold liquid, such as liquid nitrous oxide at a temperature of approximately —128° F. Liquid nitrogen or liquid air can also be used, or similar liquids of comparable low temperature. In the preferred method, the temperature of the liquid is at least as low as approximately —100° F. The term "immersed" is used herein to designate a covering of the fruit with a liquid for a limited period of time. Ordinarily, the immersion will be a dipping of the fruit in the liquid, but it can be a covering of the fruit by spraying liquid on it. When the immersion is by dipping, a number of pieces of fruit can be treated simultaneously by placing them in a wire mesh basket.

The period of the immersion should be long enough to freeze the fruit to a solid condition; but it can be longer. A period of nine seconds has been found sufficient with orange sections immersed in nitrous oxide at a temperature of about —128° F.

When the fruit is withdrawn from the low temperature liquid, it is found to have been shattered by thermal shock, i.e., extensive separation of the fruit has taken place along the segment walls and between individual juice cells. Sharp, crackling sounds are heard as the fruit is withdrawn from the liquid into an ambient atmosphere at room temperature. This shattering phenomena is not clearly understood. It must result from thermal shock, but it is not apparent to what extent the shattering shock occurs during the freezing, or while the extremely cold fruit is being brought into an atmosphere at much higher temperature.

Both the sudden freezing and the sudden transferring from the extremely low temperature to a higher temperature are believed to contribute to the shattering, but research on the invention has not been carried far enough to learn the full extent to which the conditions can be varied while still obtaining such advantageous results.

If the shattering is entirely the result of setting up steep temperature gradients in the fruit, then it appears that some of the shattering occurs at the time of the freezing, and other at the time of withdrawal of the fruit from the low temperature liquid.

The shattering occurs even though the fruit has been refrigerated to a temperature of about 34° to 36° F. at the time of immersion, and even though the fruit is withdrawn from the liquid to a medium of higher temperature that is considerably lower than room temperature.

When the process is not mechanized, it is an advantage to transfer the fruit to the ambient atmosphere at room temperature because this is the most convenient and economical way for carrying out the method. It is important, however, that further processing be done with the fruit in a solid frozen state; and when any substantial time is required after the dip, the process steps carried out during that time must be done at freezing temperature. Agitation of the shattered sections, while still frozen, causes them to crumble further into individual or discrete juice cells, but the juice cells themselves are not broken and are distinct from one another and individually intact.

Processing of the fruit while in this frozen condition and with the juice cells intact, permits them to be completely separated from each other and from the pithy material, carpellary membranes, seeds and vascular bundles. This eliminates from the frozen juice the substances which have been found to cause objectionable losses in stability and quality.

The agitation or separation can be carried out by passing chunks of adhering cells, on a belt under resilient rollers, or between such rollers. This detaches juice cells from one another and also from the membranes that cover the sections.

The juice cells may then be separated from these carpellary membranes and from the pithy material, seeds, and vascular bundles by means of shaking sieve screens that let the juice cells go through them and stop the other parts of the fruit. Other methods of separation can be used.

The final mass of discrete juice cells is thus made substantially free of other constituents, and especially those other parts of the fruit that impair the keeping quality of the juice, probably because of their enzyme action. These frozen cells are packaged and are themselves an article of commerce, especially when sold in their frozen condition. When the frozen cells are to be kept for a long time, they are preferably packaged in an atmosphere of nitrogen or other gas that does not affect the cells; and this preserves the frozen cells against deterioration or change for longer periods. Other barrier gases that can be used are carbon dioxide, argon, helium, nitrous oxide and mixtures of these gases or other suitable inert gases.

When packaged in a gas atmosphere, the cells may be in a bottle or can, or any gas-tight container, and inert gas provides a barrier around the cells. It preserves the color of the frozen cells and prevents changes in taste, and other changes which normally occur over long periods of time, when the frozen cells are left exposed to contact with air.

FIG. 2 shows a container 10 having a side wall 11 and a bottom 12 which may be made of glass or plastic. The container 10 is filled with frozen juice cells 14; and the top of the container is closed by a cover 16 with a sealing gasket 18.

This glass or plastic container 10 is merely representative of containers which can be sealed and it will be understood that cans and other kinds of containers can be substituted for that shown in FIG. 2.

FIG. 3 is a fragmentary view on a greatly enlarged scale showing the juice cells 14 of FIG. 2. Each of these juice cells 14 is preferably maintained in a frozen state and the cells are separate, discrete units which contact with one another in a manner similar to rice or other granular material. This means that there are spaces throughout the mass of cells, as is clearly illustrated in FIG. 3. Where maximum shelf life is desired, it is these spaces within the mass of cells which are filled with nitrogen or other barrier gas. The barrier gas also fills the space at the top of the mass of cells 14 immediately under the cover 16 (FIG. 2) and thus prevents any oxygen from reaching the cells 14.

Another characteristic of the frozen cells of this invention, as compared with other frozen citrus fruit juice, is in the size of the frozen crystals. The crystals are smaller than with juice which has been frozen more slowly. It is difficult to determine crystal size by actual measurement, but they can be compared with other masses of crystals to determine relative size; and they will be defined herein as juice crystals of the size characteristic obtained by immersion of the fruit in a freezing medium having a temperature less than approximately −100° F.

The frozen cells are used in their frozen condition for flavoring ice cream, sherbert, and ices. They are distributed through the ice cream, sherbert or ices as discrete particles. In this manner they produce a unique and pleasing appearance. They are also used for flavoring in icing for cakes, and if the mixing with the other ingredients of the icing is accomplished while the juice cells remain solid, and without breaking the cells, they provide discrete flavor sacs throughout the icing.

FIG. 4 shows a cake 20 supported by a cake board 22 and covered with icing 24. Juice cells 26 are shown distributed throughout the icing.

FIG. 5 shows a dish 30 in which there is a serving of ice cream 32; and there are juice cells 26 distributed throughout the ice cream in the same manner as they are distributed throughout the cake icing in FIG. 4.

If the cells are broken during preparation of the icing, the fruit juice is distributed through the icing and in more intimate mixing with the other ingredients to provide an effect in the flavor, but not by way of discrete flavor pockets.

In addition to the use in icings, the cells of this invention can be added to fruit juice which has been preserved in other ways and to improve its quality and taste, and it can be used as a component for beverages, both carbonated and uncarbonated, for confections and other various food products.

FIG. 6 shows a glass 40 containing a beverage 42 which may be either carbonated or uncarbonated. Citrus fruit juice 41, prepared in accordance with this invention, is mixed with the beverage 42 and is shown pouring from a pitcher 48 in FIG. 6. It will be understood that frozen or thawed discrete juice cells can be added to the beverage 42, or the ruptured cells with the cell walls present as a "pulp," can be used in the beverage 42.

FIG. 7 shows a container 53, which may be made of metal or fibreboard, containing frozen fruit juice concentrate 56 through which is distributed juice cells 26. These juice cells, added to the frozen fruit juice concentrate, restore flavor loss which is commonly experienced with concentrated citrus fruit juice, and especially orange juice. The cells may be added, in a similar manner, to single strength juice which has not been concentrated. So used, they add "pulp" to the juice and given it a consistency which is more attractive to the consumer.

FIG. 8 shows juice cells 26 distributed through cottage cheese 58. This cottage cheese 58 is shown in a dish 60, and is shown in elevation; but it will be understood that the juice cells 26 are distributed throughout the cheese 58 in the same manner as they are distributed throughout the ice cream in FIG. 5.

The juice cells can be used in other dairy products, in confections, jellies, preserves, and a wide variety of comestibles which are of a consistency to permit mixing of the cells with the comestible. Even though the comestible has a final consistency which does not permit mixing, the cells can be distributed through it if the comestible is made by a process which permits mixing at some stage of its manufacture. For example, the cells can be distributed through a jelly, before the jelly hardens, and through ice cream before the ice cream is frozen.

After the juice cells have thawed, there is no objection to having them rupture during further handling of the orange juice because the parts of the orange which should be kept out of the juice have been separated from the juice cells during the time when they were frozen. The thawed orange juice has the fresh fruit flavor since oils producing the flavor are contained in the juice cells. It also has the natural color which comes from the yellow chromatophores contained in the walls of the juice cells. The inclusion of these cell walls in the juice is desirable because they give additional body to the orange juice and make it more nearly like the juice of a freshly squeezed orange which always contains considerable pulp, unless it has been especially strained.

If the orange juice prepared in accordance with this invention is to be kept for substantial periods of time before use, then the cells are kept in their frozen condition and there is no noticeable change in the qualities of the juice, including the taste which seems to be the most sensitive quality, over long periods of time.

For some purposes, whole or substantially whole sections of the fruit are preferred to juice, or detached juice cells. This invention can be used to prepare such sections by reducing the amount of shattering and by separating the carpellary membranes and other parts of the fruit from the juice cells of individual sections while the juice cells of those sections remain connected together.

When sections are to be separated from their membranes and other solid parts of the orange, without shattering the contents of the sections, the thermal shock is reduced by coating the fruit with a layer of material which has some heat-insulating effect. It has been found that the thermal shock is reduced by using a coating of sugar. Although this does not prevent the shattering of the membranes when the fruit is dipped in the extremely cold liquid, such as nitrous oxide, it does reduce the breaking apart of the juice cells with the membrane, and larger portions of the section remain intact.

The invention has been described in its preferred embodiments, but changes and modifications can be made, and some features can be used in different combinations without departing from the invention as defined in the claims.

What is claimed is:

1. The method of treating citrus fruits which comprises peeling the fruit, immersing the fruit in a liquid having having a temperature at least as low as −100° F. for a period long enough to freeze the fruit to a solid condition, removing the fruit from the liquid into an atmosphere at approximately room temperature, and with the fruit so frozen separating the unruptured juice cells from the remainder of the fruit.

2. The method of treating citrus fruits, as described in claim 1, and in which the unruptured juice cells are also separated from one another by agitation while in frozen condition.

3. The method of treating citrus fruits, as described in claim 1, and in which the peeled fruit is broken up along divisions between segments of the fruit prior to immersion.

4. In the packing of frozen citrus fruit, the improvement which comprises peeling the fruit and shattering apart the peeled fruit by thermal shock produced by dipping the fruit in cold liquid having a temperature at least as low as −100° F., the fruit being left in the liquid long enough to solidify the juice cells, separating the unruptured juice cells from pithy portions of the fruit, and packaging the juice cells.

5. The method of packing juice of a fruit that has juice cells enclosed in membranes of segments of the fruit, which segments surround a pithy core, and that has vascular bundles extending between the segments, and that has a pithy peel lining adhering to outside peripheral surfaces of the segments, which method comprises peeling the fruit, then shattering segments of the fruit by subjecting them to shock thermal stresses by dipping at least some of the segments into very low temperature liquid having a temperature at least as low as −100° F. with the segments connected together and with the vascular bundles between them and some of the pithy material adhered to said segments, the dip being long enough to freeze the juice cells to a solid condition, disconnecting unruptured juice cells from one another and from the segment membranes, vascular bundles and the pithy material while in solid, frozen condition to obtain a fruit juice free of the enzymes contained in said membranes, vascular bundles and pithy material, and thereafter packing the juice cells while still frozen.

6. The method described in claim 5 and in which the fruit treated is an orange and in which pectinesterase enzymes are separated from the juice cells by removing the segment membranes, vascular bundles and the pithy material.

7. The method of packing fruit juice, as described in claim 5, and in which the thermal shock, freezing dip is performed with a liquid having a temperature as low as at least minus 100° F., and the fruit is removed from the liquid into an atmosphere at approximately room temperature.

8. The method of separating the sections of a citrus fruit from the vascular bundles and pithy material that surrounds the sections, which method includes peeling the fruit, coating the connected sections with a layer of material which has some heat insulating effect for reducing thermal shock, subjecting the fruit to a limited period of contact with a low temperature freezing medium having a temperature at least as low as −100° F., shattering the segments apart by said period of contact with the freezing medium, maintaining the contact long enough to freeze the sections to a solid condition, and then removing the shattered sections from the vascular bundles and pithy material while the sections are in solid frozen condition.

9. The method of separating sections of fruit as described in claim 8, and in which a sugar solution is applied to the segments to reduce the thermal shock.

10. The method of obtaining the unruptured juice cells of citrus fruits, as discrete particles, which method comprises immersing a peeled section of citrus fruit in a liquid having a temperature at least as low as −100° F. to substantially freeze said section and with the fruit so frozen separating the unruptured juice cells from one another.

11. A food product consisting of a granular mass of discrete, solidly-frozen, unruptured juice cells of a commercially ripe citrus fruit, substantially free of other constituents of the fruit.

References Cited by the Examiner

UNITED STATES PATENTS

| | | | |
|---|---|---|---|
| 1,731,476 | 10/1929 | Stevenson | 99—193 |
| 2,086,911 | 7/1937 | Hill | 99—100 |
| 2,818,342 | 12/1957 | Ransom | 99—54 |
| 2,853,386 | 9/1958 | Hughes | 99—54 |

OTHER REFERENCES

"Betty Crocker's Picture Cook Book," 1st ed., McGraw-Hill, New York, 1950, pages 159 and 169.

"Betty Crocker's Picture Cook Book," 1st ed., McGraw-Hill, New York, 1950, p. 167.

Circular 331, Univ. of Calif., College of Agriculture, Agricultural Experiment Station, Berkeley, Calif., December 1933, pp. 9 and 10.

Modern Packaging, September 1952, pp. 110 and 113 and 214 to 215.

A. LOUIS MONACELL, *Primary Examiner.*

ABRAHAM H. WINKELSTEIN, *Examiner.*